(12) United States Patent
Krueger (10) Patent No.: US 8,428,784 B2
(45) Date of Patent: Apr. 23, 2013

(54) ROTATIONAL SPEED DETERMINATION (75) Inventor: Thomas Krueger, Westerroenfeld (DE)

(73) Assignee: Repower Systems SE, Hamburg (DE)

( * ) Notice: Subject to any disclaimer, the term of this patent is extended or adjusted under 35 U.S.C. 154(b) by 1016 days.

(21) Appl. No.: 12/133,768

(22) Filed: Jun. 5, 2008

(65) Prior Publication Data
US 2008/0303281 A1  Dec. 11, 2008

(30) Foreign Application Priority Data
Jun. 7, 2007  (DE) ......................... 10 2007 026 995

(51) Int. Cl.
| B64C 27/00 | (2006.01) |
| F01B 23/00 | (2006.01) |
| F01D 7/00  | (2006.01) |
| F03D 3/06  | (2006.01) |
| F03D 9/00  | (2006.01) |
| G05D 17/00 | (2006.01) |

(52) U.S. Cl.
USPC ............... 700/287; 290/44; 290/55; 416/43; 416/44; 416/61

(58) Field of Classification Search ............ 700/83, 700/287; 290/44, 55; 416/43, 44, 61
See application file for complete search history.

(56) References Cited

U.S. PATENT DOCUMENTS

| 4,189,648 A |   | 2/1980 | Harner |
| 4,297,076 A | * | 10/1981 | Donham et al. ............... 416/37 |
| 4,435,647 A | * | 3/1984 | Harner et al. ................ 290/44 |
| 4,445,087 A |   | 4/1984 | Mehnert |
| 4,450,403 A |   | 5/1984 | Dreiseitl et al. |
| 4,635,209 A |   | 1/1987 | Hwang et al. |
| 4,700,081 A | * | 10/1987 | Kos et al. ................... 290/44 |
| 5,083,039 A | * | 1/1992 | Richardson et al. ........... 290/44 |

(Continued)

FOREIGN PATENT DOCUMENTS
| DE | 3018528 | 11/1981 |
| DE | 3924422 | 2/1990 |

(Continued)

OTHER PUBLICATIONS

Int-Hout, Dan. "ECM Motors in Fan Powered Terminal Units." Krueger. Sep. 30, 2002 <www.krueger-hvac.com/lit/pdf/witeecm.pdf>.*

(Continued)

*Primary Examiner* — Mohammad Ali
*Assistant Examiner* — Jennifer L Norton
(74) *Attorney, Agent, or Firm* — Rankin, Hill & Clark LLP (57) ABSTRACT

The invention relates to a method for the operation of a wind power plant (11) with a rotor (10) and a rotating apparatus (20, 22, 24) connected with the rotor (10), wherein a rotor speed ($n_R$) and a rotating apparatus speed (n) are interrelated via a specifiable transmission ratio, wherein the rotating apparatus speed (n) is determined, and wherein a rotational speed measurement value ($rpm_i$) is captured for the determination of the rotating apparatus speed (n). The method according to the invention is characterized in that the rotational speed measurement value ($rpm_i$) is corrected with an intermittently variable correction value ($rpm_{i,c}$) so that the determined rotating apparatus speed ($rpm_{i,f}$) results, and wherein the determined rotating apparatus speed ($rpm_{i,f}$) is fed as the actual value into a regulation apparatus (36) of the wind power plant (11).

13 Claims, 4 Drawing Sheets

U.S. PATENT DOCUMENTS

| | | | | |
|---|---|---|---|---|
| 5,239,245 | A * | 8/1993 | Lee | 318/567 |
| 6,137,187 | A * | 10/2000 | Mikhail et al. | 290/44 |
| 7,857,586 | B2 * | 12/2010 | Wobben | 416/1 |
| 7,887,292 | B2 * | 2/2011 | Kuhlmeier | 416/1 |
| 7,942,634 | B2 * | 5/2011 | Christensen | 416/1 |
| 8,093,737 | B2 * | 1/2012 | Wittekind et al. | 290/44 |
| 8,093,738 | B2 * | 1/2012 | Stiesdal | 290/44 |
| 8,328,514 | B2 * | 12/2012 | Viripullan et al. | 416/35 |
| 8,355,824 | B2 * | 1/2013 | Yasugi | 700/287 |
| 2002/0029097 | A1 * | 3/2002 | Pionzio et al. | 700/286 |
| 2005/0184689 | A1 * | 8/2005 | Maslov et al. | 318/254 |
| 2005/0253541 | A1 * | 11/2005 | Stork | 318/254 |
| 2007/0069522 | A1 * | 3/2007 | Barton et al. | 290/44 |
| 2008/0001409 | A1 * | 1/2008 | Schellings | 290/44 |
| 2011/0241343 | A1 * | 10/2011 | Petter | 290/44 |
| 2012/0042727 | A1 * | 2/2012 | Egedal | 73/504.03 |

FOREIGN PATENT DOCUMENTS

| | | |
|---|---|---|
| DE | 19721488 | 11/1998 |
| DE | 102006017146 A1 | 11/2006 |
| EP | 167463 A1 * | 1/1986 |
| EP | 0059244 | 5/1988 |
| EP | 1 524 433 A1 | 4/2005 |
| EP | 1524433 | 4/2005 |
| EP | 1596493 | 11/2005 |
| EP | 1672372 | 6/2006 |
| EP | 1835293 | 9/2007 |
| GB | 2198241 | 6/1988 |
| WO | 2007104306 | 9/2007 |

OTHER PUBLICATIONS

Wilmar Hernandez, "A Survey on Optimal Signal Processing Techniques Applied to Improve the Performance of Mechanical Sensors in Automotive Applications" Sensors, MDPI, Basel, SU, Bd. 7, Jan. 27, 2007, Seiten 84-102, XP007902715 ISSN: 1424-8220.

E.L. Van Der Hooft, et al; Wind Turbine Control Algorithms; DOWEC-F1W1-EH-03-094/0.

* cited by examiner

ROTATIONAL SPEED DETERMINATION

BRIEF SUMMARY OF THE INVENTION

The invention relates to a method for the operation of a wind power plant with a rotor and a rotating apparatus connected with the rotor, wherein a rotor speed and a rotating apparatus speed are interrelated via a specifiable transmission ratio, and wherein the rotating apparatus speed is determined, wherein a rotational speed measurement value is captured for the determination of the rotating apparatus speed.

The rotational speed capture is an important component of the control and regulation system of the wind power plant. Within the framework of the invention, a regulation apparatus is also understood in particular as a control apparatus. In order to achieve a fast reaction time, the rotational speed capture takes place on the fast side of the drive train or the output side of a gearbox. A multi-pulse rotational speed measurement is performed. For this, a highly accurately manufactured rotational speed measurement disk or transmitter disk, which is scanned via a, for example, inductive proximity switch, provided with cams is mounted on the coupling disk or on an output shaft of the gearbox. For this, the distance between two cams must be captured very exactly, for example the angle division of the rotational speed measurement disk must have a tolerance in the range of approx. $\frac{1}{100}°$. This production accuracy is only achieved with great effort. Moreover, there are many wind power plants with a clearly defective rotational speed signal behavior.

A method for the rotational speed regulation of a wind power plant is known from EP 1 524 433 A1, wherein the relative rotational speed is calculated with the help of a transmitter arrangement with at least one transmitter section and a sensor arrangement with at least two sensors, which respond to the transmitter section in the case of a relative rotational movement between the transmitter arrangement and the sensor arrangement, through evaluation of the signals of the sensor arrangement, wherein time t, which is required respectively by a transmitter section between two sensors arranged at a fixed distance from each other and behind each other in the direction of rotation, is measured, and the rotational speed n is calculated based on time t and the geometric factors of transmitter and sensor arrangement, and wherein a rotational speed actual signal corresponding to the calculated rotational speed is transmitted to a regulator, which gives at least one control signal $v_i$ to an adjustment apparatus for a blade adjustment of a rotor when the rotational speed actual signal differs from a rotational speed setpoint value.

The object of the present invention is to further develop the initially named method for the operation of a wind power plant with a rotor and a rotating apparatus connected with the rotor, wherein a rotor speed and a rotating apparatus speed are interrelated via a specifiable transmission ratio, wherein the rotating apparatus speed is determined, wherein a rotational speed measurement value is captured for the determination of the rotating apparatus speed such that a very exactly determined rotating apparatus speed can be determined in a relatively short period, which mainly corresponds to the actual rotational speed of the rotating apparatus. Measurement errors due to inaccuracies of the measurement disk or a measurement apparatus can, hereby, be largely eliminated.

This object is attained through a method for the operation of a wind power plant with a rotor and a rotating apparatus connected with the rotor, wherein a rotor speed and a rotating apparatus speed are interrelated via a specifiable transmission ratio, wherein the rotating apparatus speed is determined, wherein a rotational speed measurement value is captured for the determination of the rotating apparatus speed, wherein the rotational speed measurement value is corrected with an intermittently variable correction value, so that the determined rotating apparatus speed results, and wherein the determined rotating apparatus speed is fed to a regulator of the wind power plant as the actual value.

Through the use of an intermittently variable correction value for the correction of the rotational speed measurement value, whereby the determined rotating apparatus speed results, a very exact adjustment of a rotational speed correction value results so that the determined rotating apparatus speed essentially corresponds to the actual rotating apparatus speed after a few iteration steps. The intermittently variable correction value also corresponds in particular to an adaptive correction value or an adjusted correction value, which is variably adjusted over a certain time. This leads to a very exactly determined rotating apparatus speed. Through the invention, measurement errors can be largely eliminated so that the determined rotating apparatus speed value can serve very well as the actual value for a regulation apparatus of the wind power plant.

Several rotational speed measurement values are preferably captured for each revolution of the rotating apparatus and corrected with an at least intermittently variable correction value. A relatively high accuracy of the determined rotating apparatus speed is given when a difference or a quotient of the rotational speed measurement value is formed with a rotational speed measurement value average for the determination of the correction value of the rotational speed measurement value. A rotational speed measurement value average of the rotational speed measurement values captured during the revolution is preferably formed for each full revolution of the rotating apparatus. An exactly determined rotational speed measurement value results when a fitting curve, in particular a best fit straight line, is formed between two consecutive rotational speed measurement value averages, wherein a difference or a quotient of the rotational speed measurement value to the fitting curve is formed for the determination of the correction value of the rotational speed measurement value. Instead of a best fit straight line, a logarithmic function can also be conceivable as a fitting curve, or a function, which provides a weighting of the rotational speed measurement value with the variation of the best fit straight lines depending on the rotational speed measurement values. A fitting curve can also be formed, which takes into consideration a previously determined fitting curve or best fit straight line for the rotational speed measurement value averages, for example, through the formation of an average value of a formed best fit straight line with the following best fit straight line to be formed, wherein the first of the two best fit straight lines can also be weighted, for example with the factor 2 or 1.5.

The formed differences or quotients are preferably filtered for the determination of the rotating apparatus speed of the rotating apparatus. The filter, especially, preferably comprises a difference equation or is in particular a difference equation. A very exactly determined rotating apparatus speed is hereby possible with a short calculation period.

N rotational speed measurement values are preferably captured for each full rotation of the rotating apparatus, wherein N is a natural number, which is preferably an even number.

In a further embodiment of the method according to the invention, it is checked whether each capturable rotational speed measurement value is captured. Furthermore, each captured rotational speed measurement value is, preferably, continuously corrected.

It is especially preferred when the intermittently variable correction value is firmly set after a specifiable time, a specifiable number of revolutions and/or after falling below a specifiable upper limit of a variance of a first correction value of a revolution of the rotating apparatus to the first correction value of the next revolution of the rotating apparatus. The intermittently variable correction value is hereby accordingly firmly set after the specifiable time, the specifiable number of revolutions or after falling below the specifiable upper limit, wherein a respectively firmly set correction value is provided for each rotational speed measurement value, for example in the form of a factor, which is multiplied up to the respective measured rotational speed measurement value in order to form the determined rotating apparatus speed, or in the form of an additive term.

The infeed of the determined rotating apparatus speed as an actual value to a regulation apparatus of the wind power plant preferably occurs for the setting of the rotor blade adjustment angle and/or for the setting of electrical parameters of an electrical system of the wind power plant, in particular of the power, the torque or the phase of the alternating voltage.

The rotating apparatus speed is preferably limited when a specifiable rotational speed range, in particular adjustable during operation, is exceeded or fallen short of.

When a specifiable difference is exceeded between two consecutive rotational speed measurement values and/or two consecutive rotational speed measurement value averages, it is practical that the last rotational speed measurement value and/or rotational speed measurement value average is ignored. The correction value is preferably limited to a specifiable maximum value when the amount of the difference of the rotational speed measurement value to a rotational speed measurement value average exceeds a specifiable value.

An error message is preferably triggered in the aforementioned cases so that it can be checked how a corresponding error could have occurred.

A computer program with program code means is preferably provided, which are adapted to execute the method according to the invention when the computer program runs, in particular in a regulation apparatus of a wind power plant. The computer program just described is preferably saved on a data carrier readable by a computer. A regulation apparatus of a wind power plant is also preferably provided with a method according to the invention running in the regulation apparatus, which was described above.

The invention is described below, without restricting the general intent of the invention, based on exemplary embodiments in reference to the drawings, whereby the drawings are expressly referred to with regard to the disclosure of all details according to the invention that are not explained in greater detail in the text.

DETAILED DESCRIPTION OF THE INVENTION

In the following figures, the same or similar types of elements or corresponding parts are provided with the same reference numbers in order to prevent the item from needing to be reintroduced.

Figures 1, 2:
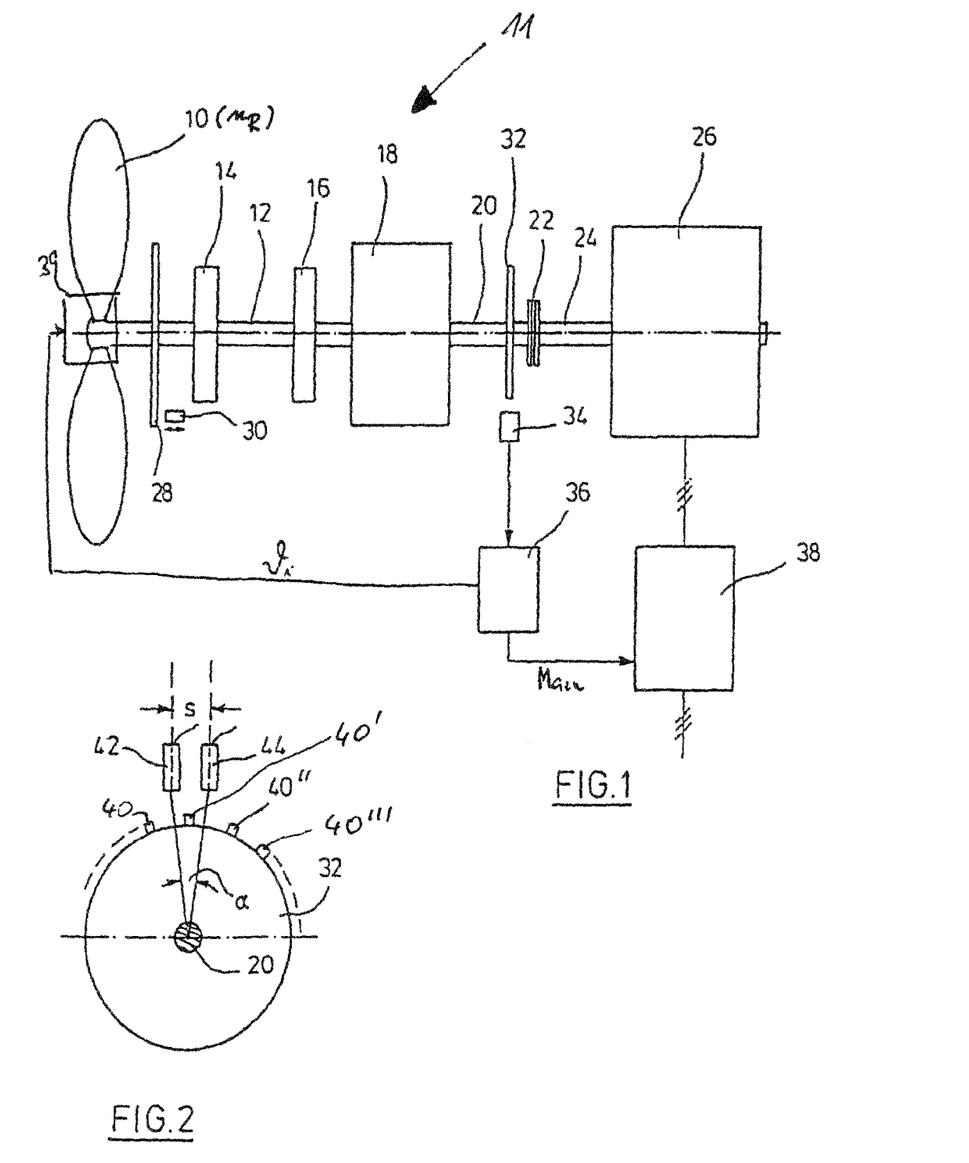
FIG. 1 shows a schematic view of a block diagram of a conventional wind power plant.
FIG. 2 shows a schematic view of a rotational speed measurement arrangement for the wind power plant according to FIG. 1.

FIG. 1 shows a rotor 10 of a wind power plant 11, the shaft 12 of which is mounted in two bearings 14, 16. The shaft 12 is the input shaft of a gearbox 18 not described in greater detail, which transmits the rotational speed of the shaft to a higher rotational speed, for example by the factor 100. An output shaft 20 of the gearbox 18 is coupled with a shaft 24 of an alternator 26 via a coupling 22. A locking disk 28 is arranged in a torque-proof manner on the shaft 12, which works together with a locking element 30, between the wind rotor 10 and the first bearing 14. If the locking element 30 is inserted, for example, into an opening or recess in the locking disk 28, the rotation of the shaft 12 is thereby prevented. A transmitter disk 32 is arranged in a torque-proof manner on the shaft section 20 near the coupling 22. It works together with a sensor arrangement 34, the signals of which are transmitted to a computer 36. As regulator, the computer 36 sends a torque control signal to a converter 38 for the alternating current created by the generator 26. The converter creates alternating current with corresponding specifiable parameters for the purpose of the feeding to a network. It should be mentioned that it is possible with the help of a load-optimized regulation of the converter 38 to realize an electronic vibration damping for the drive train according to FIG. 1. An exact capture of the rotational speed at the drive train is required for this type of regulation.

The rotor 10 contains a blade adjustment apparatus 39 for the blades of the rotor 10. At least one control signal $v_i$ is sent to the blade adjustment apparatus 39 by the computer 36. A control signal can be created for each blade in the case of two or more blades of a rotor. The regulator, for example, may be implemented in the computer 36. The rotational speed actual signal or the rotating apparatus speed determined according to the invention is calculated in the computer 36 from the signals of the sensor arrangement 34 and can, for example, be compared with a rotational speed setpoint value signal in order to determine at least one control signal $v_i$ for the blade adjustment apparatus 39.

It can be seen in FIG. 2 that the transmitter disk 32 has a series of radial cams 40 on its perimeter, which have a certain same distance from each other. Two sensors 42, 44 are arranged at a distance s on the perimeter of the cam plate 32. The sensors 42, 44 arranged behind each other in the rotational direction of the transmitter disk mainly result in the sensor arrangement 34 according to FIG. 1. Alternatively, just one rotational speed sensor can also be provided. A perforated disk can also be provided instead of the transmitter disk 32 in the form of a cam plate. The distance between the cams 40 is preferably greater than the distance s between the sensors 42, 44. The sensors 42, 44 are preferably arranged radially, which is not shown, so that the separate distance is not a straight line but rather an arc with an arc angle α. This results in the rotational speed n from α/(360°*t), wherein α is the arc angle between the sensors and t is the time, which a cam needs to move from the first to the second sensor.

The transmitter disk 32 can be made, for example, out of a single piece of metal, for example iron, and the sensors 42, 44 can be designed as proximity sensors, which generate a signal when a cam 40 comes into proximity of the sensor 42, 44. When observing an individual cam, for example cam 40', roughly rectangular impulses result for the sensor signal, wherein the period of the signal is a time t, which is required by a cam 40, 40', 40", 40''' for the distance between sensor 42 and sensor 44 during the revolution of the transmitter disk 34. The time t is measured in the computer 36 and a determination of the rotational speed measurement value takes place in the computer according to the formula $rpm_i=\alpha/(360°*t)$ or $rpm_i=s/t*U$, wherein $\alpha$ or s is the distance between the sensors, t is the time and U is the circumference of the transmitter disk 34, namely in the area of the radial ends of the cams 40.

Figure 3:
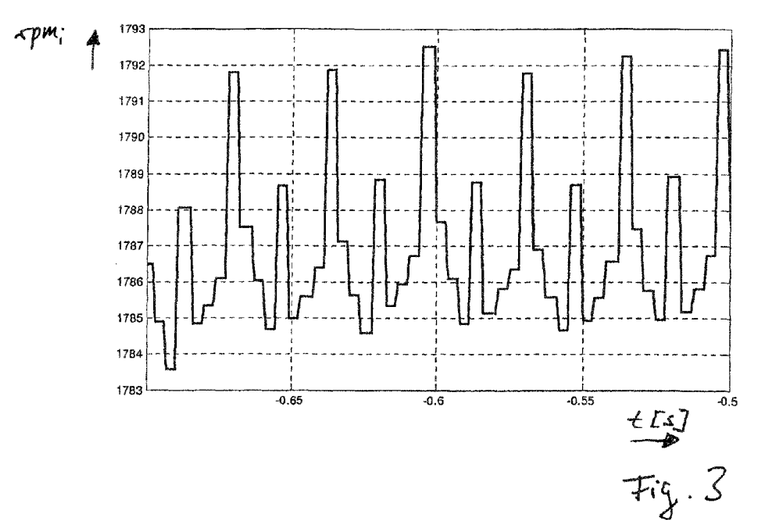
FIG. 3 shows a schematic diagram of a rotational speed signal over time.

The transmitter disk 34, which can also be designed as a coupling disk or may be mounted on the coupling disk as a rotational speed measurement disk 34 or transmitter disk should be a highly accurately manufactured rotational speed measurement disk. The average measurement delay is half the time period between the passing of two cams. In the case of a number of N=8 cams and a rotational speed of 1,800 rpm, the measurement delay is thus 2.1 ms. The problem with a measurement method is that the distance between two cams must be captured very exactly and that the angle division of the rotational speed disk must have a tolerance in the range of approx. $\frac{1}{100}°$. It is problematic to reach this production accuracy, since it has been shown, that various wind power plants with highly defective rotational speed signals exist, such as shown in FIG. 3. FIG. 3 shows a typical progression of a captured rotational speed signal or a rotational speed measurement value $rpm_i$ over time, in seconds, in the case of a corresponding inaccuracy of the rotational speed measurement disk or transmitter disk 32. As can be seen in FIG. 3, the measured rotational speed $rpm_i$ fluctuates between 1,783.5 and 1,792.5 revolutions per minute.

Through the method according to the invention, the measurement error caused by the inaccuracy of the measurement disk can largely be eliminated. The rotational speed signal or the determined rotating apparatus rotational speed $rpm_{i,f}$ can be further processed in a highly dynamic manner by the regulator 36, which is important, for example, for the optimal function of the drive train damper. There is no method in the state of the art for the correction of the tolerances in the measurement disk. There is only a method for the digital filtering of signals, for example an FIR filter, e.g. for the gliding average formation, or an IIR filter, for example Butterworth, Chebyshev or an elliptical filter. While these digital filters can smooth out inaccuracies in the measured rotational speed signals or the rotational speed measurement value $rpm_i$, they have the disadvantage of delaying the signal considerably. The delay time for a correspondingly suitable design of a filter lies between 10 and 15 ms, so that the dynamics of the control are considerably deteriorated. Moreover, the conceptual design of such a filter is very complicated and difficult.

The method according to the invention is based on the fact that the method or the filter adjusts to the geometry of the measurement disk or transmitter disk 34 afflicted with inaccuracies. The method hereby counts the cams of the rotational speed disk or the transmitter disk 32 and registers which cam last passed by the sensor. The rotational speed value or rotational speed measurement value $rpm_i$ measured at the cam i is then amended by a correction factor or a correction member $rpm_{i,c}$. The filtered value of the rotational speed or the determined rotational speed $rpm_{i,f}$ thus results in $$rpm_{i,f}=rpm_i-rpm_{i,c} \quad (Eq.1)$$

Figure 4:
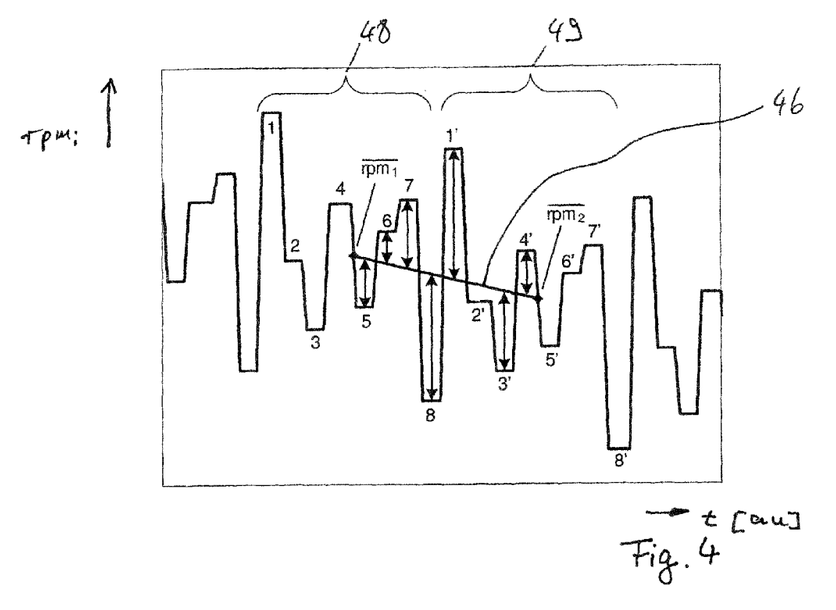
FIG. 4 shows a schematic diagram of a measured rotational speed over time.

The determination of the correction factors occurs consecutively and is clarified in FIG. 4. An adaptation step of the filter always begins when the measurement disk or transmitter disk 32 has performed two full revolutions. The rotational speed measurement values of the individual revolutions $rpm_{i,1}$ and $rpm_{i,2}$ with i=1 through N, wherein N can be divided by two in this case, belonging to the individual cams are shown in the illustration with 1 through 8 for the revolutions 1 or 1' through 8' for the revolution 2. The numbering of the cams is thus coincidental or the beginning of the numbering is coincidental and only depends on when the method is started.

After the completion of two revolutions, a best fit straight line 46 is determined from the middle point of the revolution 1, which is labeled with reference number 48, to the middle point of the revolution 2, which is labeled with reference number 49. This generally concerns the $m^{th}$ revolution 48 and the $(m+1)^{th}$ revolution 49, wherein m is a natural number. The transition between the cam N/2 and N/2+1 is defined as the middle point of the revolution. The best fit straight line is then determined by the linear connection of the arithmetic averages of the revolutions 1 and 2 or m and (m+1). These averages are labeled with $\overline{rpm_1}$ and $\overline{rpm_2}$. They are determined as follows:

$$\overline{rpm_1} = \frac{1}{N}\sum_{i=1}^{N} rpm_{i,1} \quad (Eq. 2)$$

$$\overline{rpm_2} = \frac{1}{N}\sum_{i=1}^{N} rpm_{i,2}$$

The second half of the first revolution and the first half of the second revolution are observed for further calculation. The rotational speed along the best fit straight lines is determined through interpolation over the individual cams. The following applies to the second half of the first revolution $$rpm_{i,a} = \overline{rpm_1} + (\overline{rpm_2} - \overline{rpm_1})\frac{2i-N-1}{2N} \quad (Eq. 3)$$

for $i = N/2 + 1 \ldots N$ while the following applies to the first half of the second revolution $$rpm_{i,a} = \overline{rpm_1} + (\overline{rpm_2} - \overline{rpm_1})\frac{2i+N-1}{2N} \quad (Eq. 4)$$

for $i = 1 \ldots N/2$

The difference between the rotational speed measurement values N/2+1 ... N and 1 ... N/2 and the interpolated value of the best fit straight lines is determined next $$\Delta rpm_i = rpm_{i,1} - rpm_{i,a} \text{ for } i=N/2+1 \ldots N \quad (Eq.5)$$

and $$\Delta rpm_i = rpm_{i,2} - rpm_{i,a} \text{ for } i=1 \ldots N/2 \quad (Eq.6)$$

Figure 5:
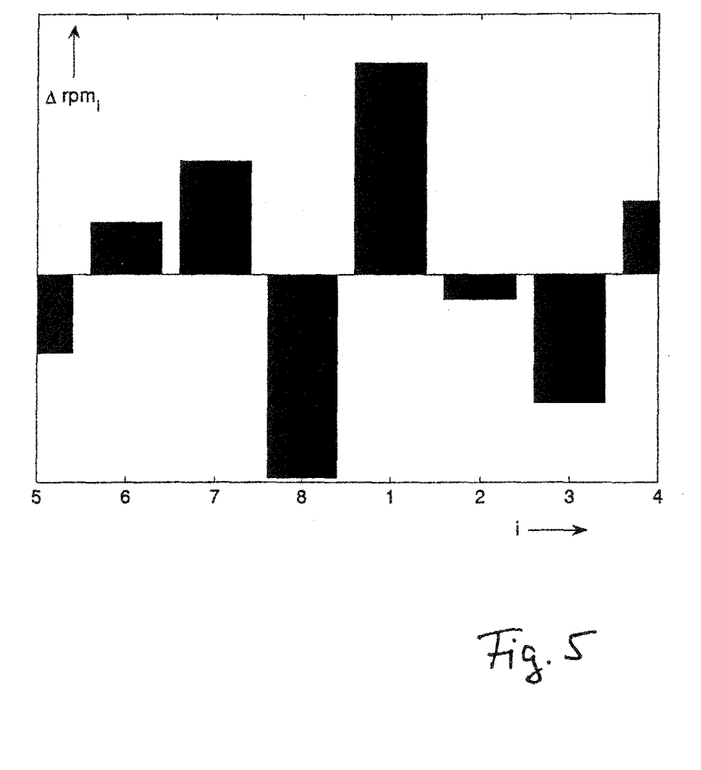
FIG. 5 shows a schematic view of the calculated rotational speed differences for the individual cams of a measurement disk.

This results in the corresponding rotational speed differences $\Delta rpm_i$, which are indicated by the arrows in FIG. 4, and for better presentability are shown again schematically in FIG. 5, but via the cam number.

The N rotational speed differences determined in this manner are given to N filters as the input parameter. The following difference equation is thereby processed for each cam $$rpm_{i,c}(t+1) = A\, rpm_{i,c}(t) + (1-A)\Delta rpm_1(t), rpm_{i,c}(0) = 0, \quad i=1\ldots N, 0<A<1 \quad \text{(Eq.7)}$$

Here, $rpm_{i,c}(t)$ indicates the gradually building correction value for the i-th cam of the transmitter disk 32. It can be determined how fast the filter adapts to the rotational speed disk via the filter parameter A. The smaller A, the faster the adaption to the measurement disk or transmitter disk 32; the precision of the correction drops at the same time.

Figure 6A:
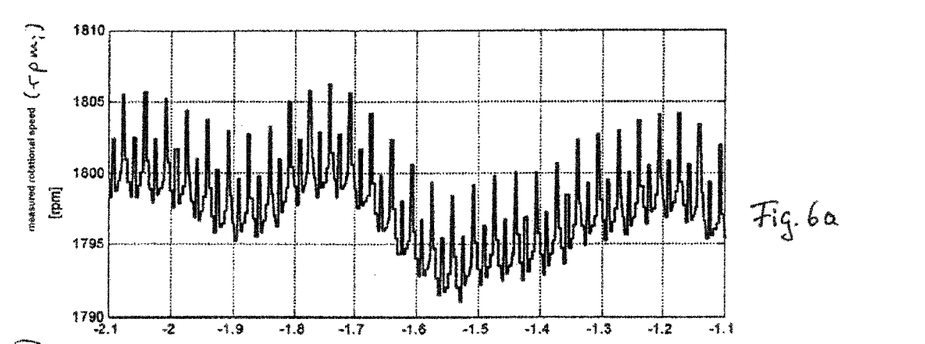
FIG. 6a shows a schematic representation of the measured rotational speed over time.
Figure 6B:
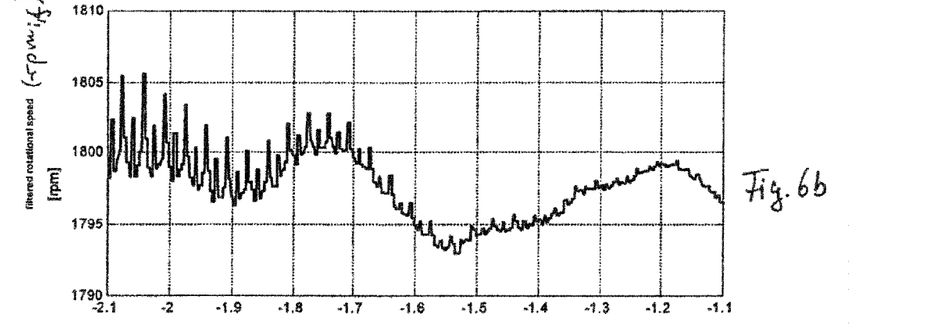
FIG. 6b shows a schematic representation of the determined rotational speed over time according to the invention based on the measurement from FIG. 6a, FIG. 6c shows a schematic representation of the actual rotational speed over time.
Figure 6C:
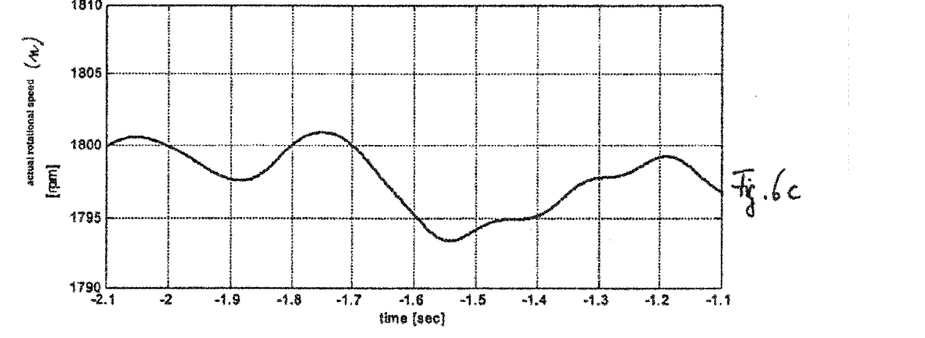

FIG. 6, and there the FIGS. 6a, 6b and 6c, show schematically the adaption process of the filter according to the invention for A=0.8. The initialization or the determination of the correction value $rpm_{i,c}$ is completed in approx. 1 s.

The upper FIG. 6a shows the rotational speed measurement value $rpm_i$ over time in s. The middle FIG. 6b shows schematically the determined rotating apparatus speed $rpm_{i,f}$ over time in t, and the bottom FIG. 6c shows the actual speed n also over time t in s. It can be seen that the determined rotating apparatus speed or the filtered rotational speed adapts very accurately to the actual rotational speed n within 1 s.

The advantage of this method is that the correction of the rotational speed measurement values takes place without signal delay. Accordingly, good correction factors can be determined after an adaption time of less than one s, preferably less than ½ s. The initialization of the method or the adaption of the correction value is only necessary once, for example during the startup of the wind power plant. There is only one single filter parameter, namely the parameter A, so that a complicated design method is not necessary for the filter. After determination of the respective correction values for the respective cams, they can be saved and applied to the rotational speed measurement values, for example through simple multiplication when, for example, the correction value is made through a quotient of the rotational speed measurement value with the rotational speed measurement value average or the fitting curve or through addition, for example during the determination of the correction value via a difference of the rotational speed measurement value to a rotational speed measurement value average or to the fitting curve so that the determined rotating apparatus speed can actually be determined without a signal delay. It may first be necessary to reinitialize the method in order to redetermine the rotational speed correction values when errors occur. It is thus provided in an advantageous embodiment of the invention that the determination of the correction value only takes place during startup or a hall test, and the saved correction values are only to be newly determined if the transmitter disk was changed or exchanged, e.g. during a maintenance assignment. In this case, the initialization of the method during startup of the wind power plant can provide that the existing correction values are synchronized with the existing impulse sequence in order to not redetermine the previously determined correction values, but rather to correctly allocate the impulses.

Problems can occur, for example, when the cams of the transmitter disk 32 are not always correctly counted. If this count impulse fails, the following can be done. An expected impulse length is calculated from the last valid rotational speed; this is 4.2 ms for example. If more than this time has passed since the last captured cam passage, the cam counting function is started. The updating of the correction factors should be blocked for this run, since there is apparently an error in the rotational speed capturing. The checking of the timeout takes place for example in the 1 ms task, i.e. in the example t=4.2 ms the cam counting routine would be branched to during the fifth run. If after this, a cam continues to not provide an impulse, an error message is generated. If all cams provide an impulse after this, the method can be reinitialized or continued.

For the interception of errors, a detection of the exceedance of the rotational speed value range, e.g. a maximum rotational speed of 3,000 rpm, is set and a detection of extreme rotational speed jumps, for example of over 100 rpm.

In both cases, these rotational speed values should be blocked and the correction procedure should also not be performed any further. It also makes sense to limit the correction terms, for example +/−20 rpm. If this limit is reached or exceeded, an error message is triggered.

LIST OF REFERENCES 1-8 Sensor signals m-th revolution
1'-8' Sensor signals (m+1)-th revolution
10 Rotor
11 Wind power plant
12 Shaft
14 Bearing
16 Bearing
18 Gearbox
20 Output shaft
22 Coupling
24 Shaft
26 Alternator
28 Locking disk
30 Locking element
32 Transmitter disk
34 Sensor arrangement
36 Computer
38 Converter
39 Blade adjustment apparatus
40, 40',40'',40''' Cams
42, 44 Sensor
46 Best fit straight line
$m^{th}$ revolution
$(m+1)^{th}$ revolution
$\upsilon_i$ Control signal
α Arc angle
$n_R$ Rotor speed
n Rotating apparatus speed
$rpm_i$ Measured rotational speed
$\Delta rpm_i$ Rotational speed difference
$rpm_{i,f}$ Determined rotating apparatus speed
$\Delta rpm_1$ First correction value of the m-th revolution
$\Delta rpm_{1'}$ First correction value of the (m+1)-th revolution
$\overline{rpm_i}$ Rotational speed measurement value average
$rpm_{i,c}$ Rotational speed correction value

The invention claimed is:

1. A method for operation of a wind power plant (11) with a rotor (10) and a rotating apparatus (20, 22, 24) connected with the rotor (10), wherein a rotor speed ($n_R$) and a rotating apparatus speed (n) are interrelated via a specifiable transmission ratio, comprising steps of:

determining the rotating apparatus speed (n), wherein for the determination of the rotating apparatus speed (n) a rotational speed measurement value ($rpm_i$) is captured by a measurement device, correcting the rotational speed measurement value ($rpm_i$) to eliminate a measurement error caused by inaccuracy of the measurement device with an intermittently variable correction value ($rpm_{i,c}$), such that the determined rotating apparatus speed ($rpm_{i,f}$) results, and feeding the determined rotating apparatus speed ($rpm_{i,f}$) to a regulation apparatus (36) of the wind power plant (11) as an actual value wherein a difference or a quotient of the rotational speed measurement value ($rpm_i$) to a rotational speed measurement value average ($\overline{rpm_i}$) is made for the determination of the correction value ($rpm_{i,c}$) of the rotational speed measurement value ($rpm_i$)

wherein a rotational speed measurement value average ($\overline{rpm_i}$) of the rotational speed measurement value ($rpm_i$) captured during a revolution is formed for each full revolution of the rotating apparatus (20, 22, 24)

wherein a fitting curve (46), is formed between two consecutive rotational speed measurement value averages ($\overline{rpm_i}$, $\overline{rpm_{i+1}}$), wherein a difference or a quotient of the rotational speed measurement value ($rpm_i$) to the fitting curve (46) is also formed for the determination of the correction value ($rpm_{i,c}$) of the rotational speed measurement value ($rpm_i$), and wherein the formed differences or quotients are filtered for the determination of the rotating apparatus speed (n, $rpm_{i,f}$) of the rotating apparatus (20, 22, 24).

2. The method according to claim 1, wherein several rotational speed measurement values ($rpm_i$) per revolution of the rotating apparatus (20, 22, 24) are captured and corrected with an at least intermittently variable correction value ($rpm_{i,c}$).

3. The method according to claim 1, wherein the filtering step comprises a difference equation.

4. The method according to claim 1, wherein N rotational speed measurement values ($rpm_i$) are captured for each full revolution of the rotating apparatus (20, 22, 24), wherein N is a natural number.

5. The method according to claim 1, wherein it is checked whether each capturable rotational speed measurement value ($rpm_i$) is captured.

6. The method according to claim 5, wherein each captured rotational speed measurement value ($rpm_i$) is continuously corrected.

7. The method according to claim 1, wherein the intermittently variable correction value ($rpm_{i,c}$) is firmly set after a specifiable time (t), a specifiable number of revolutions (48, 49) or after falling below a specifiable upper limit of a variance of a first correction value ($rpm_{i,c}$) of a revolution of the rotating apparatus (20, 22, 24) to the first correction value ($rpm_{i,c}$) of a next revolution of the rotating apparatus (20, 22, 24).

8. The method according to claim 1, wherein an infeed of the determined rotating apparatus speed ($rpm_{i,f}$) as the actual value occurs to a regulation apparatus (36) of the wind power plant (11) for setting of the rotor blade adjustment angle $\upsilon_i$ or for setting of electrical parameters of an electrical system (38) of the wind power plant (11), the parameters including at least one of: power, torque and phase of the alternating voltage.

9. The method according to claim 1, wherein the rotating apparatus speed (n, $rpm_{i,f}$) is limited when a specifiable rotational speed range, which is adjustable during operation, is exceeded or fallen short of.

10. The method according to claim 1, wherein when a specifiable difference is exceeded between two consecutive rotational speed measurement values ($rpm_i$) or two consecutive rotational speed measurement value averages ($\overline{rpm_i}$), a last rotational speed measurement value ($rpm_i$) or rotational speed measurement value average ($\overline{rpm_i}$) is ignored.

11. The method according to claim 1, wherein when an amount of the difference of the rotational speed measurement value ($rpm_i$) to a rotational speed measurement value average ($\overline{rpm_i}$) exceeds a specifiable value, the correction value ($rpm_{i,c}$) is limited to a specifiable maximum value.

12. The method according to claim 9, wherein an error message is triggered when the rotating apparatus speed (n, $rpm_{i,f}$) is limited.

13. The method according to claim 1, wherein the fitting curve (46) is a best fit straight line.

* * * * *